United States Patent
Yannone

(10) Patent No.: US 8,164,510 B2
(45) Date of Patent: Apr. 24, 2012

(54) QUANTITY SMOOTHER

(75) Inventor: Ronald M. Yannone, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 375 days.

(21) Appl. No.: 12/498,310

(22) Filed: Jul. 6, 2009

(65) Prior Publication Data

US 2010/0156697 A1 Jun. 24, 2010

Related U.S. Application Data

(63) Continuation-in-part of application No. 12/364,480, filed on Feb. 2, 2009, now Pat. No. 8,081,106.

(60) Provisional application No. 61/063,251, filed on Jan. 31, 2008, provisional application No. 61/063,290, filed on Jan. 31, 2008, provisional application No. 61/063,271, filed on Jan. 31, 2008, provisional application No. 61/063,207, filed on Jan. 31, 2008.

(51) Int. Cl.
*G01S 13/42* (2006.01)
*G01S 13/93* (2006.01)

(52) U.S. Cl. ............ 342/29; 342/56; 342/126; 342/133; 342/139; 342/146; 342/156; 342/195

(58) Field of Classification Search .................. 342/29, 342/36, 125, 126, 133, 139, 146, 147, 156, 342/195

See application file for complete search history.

(56) References Cited

U.S. PATENT DOCUMENTS

| 3,895,382 A | 7/1975 | Litchford |
| 4,293,857 A | 10/1981 | Baldwin |
| 4,370,656 A | 1/1983 | Frazier et al. |
| 4,668,954 A | 5/1987 | Tomasi |

(Continued)

FOREIGN PATENT DOCUMENTS

WO 2006135416 12/2006

(Continued)

OTHER PUBLICATIONS

Ross L. Finney, Maurice D. Weir & Frank R. Giordano, "Lines and Planes in Space", "Thomas' Calculus", 10th edition, 2003, pp. 807-808, Addison Wesley, Boston, USA.

*Primary Examiner* — John B Sotomayor
(74) *Attorney, Agent, or Firm* — Graybeal Jackson Haley LLP; Bryan A. Santarelli; Daniel J. Long

(57) ABSTRACT

In an embodiment, a quantity smoother includes a first stage and a second stage. The first stage is operable to receive a sequence of raw samples of a quantity and to generate from the raw samples intermediate samples of the quantity, the intermediate samples having a reduced level of fluctuation relative to the sequence of raw samples. The second stage is coupled to the first stage and is operable to generate from the intermediate samples resulting samples of the quantity, the resulting samples having a reduced level of fluctuation relative to the sequence of intermediate samples. For example, such a quantity smoother may be part of a target-ranging system on board a fighter jet, and may smooth an error in an estimated target range so that the fighter pilot may more quickly and confidently determine in his head a range window within which the target lies.

36 Claims, 7 Drawing Sheets

U.S. PATENT DOCUMENTS

| | | | |
|---|---|---|---|
| 5,247,307 A * | 9/1993 | Gandar et al. | 342/192 |
| 5,479,360 A | 12/1995 | Seif et al. | |
| 5,566,074 A | 10/1996 | Hammer | |
| 5,977,906 A | 11/1999 | Ameen et al. | |
| 6,150,979 A | 11/2000 | Tsui | |
| 6,564,149 B2 | 5/2003 | Lai | |
| 6,614,012 B2 | 9/2003 | Schneider et al. | |
| 6,674,434 B1 * | 1/2004 | Chojnacki et al. | 345/428 |
| 6,809,679 B2 | 10/2004 | LaFrey et al. | |
| 6,963,291 B2 | 11/2005 | Holforty et al. | |
| 7,002,510 B1 | 2/2006 | Choate et al. | |
| 7,132,961 B2 * | 11/2006 | Yannone et al. | 340/961 |
| 7,418,343 B1 | 8/2008 | McGraw et al. | |
| 7,453,400 B2 | 11/2008 | Struckman et al. | |
| 7,579,989 B2 * | 8/2009 | Winterling et al. | 342/450 |
| 7,764,217 B2 * | 7/2010 | Yannone | 342/13 |
| 8,054,216 B2 * | 11/2011 | Kinoshita et al. | 342/147 |
| 8,081,106 B2 * | 12/2011 | Yannone | 342/125 |
| 8,102,309 B2 * | 1/2012 | Nakagawa | 342/147 |
| 2005/0110661 A1 | 5/2005 | Yannone | |
| 2009/0231181 A1 * | 9/2009 | Yannone | 342/29 |
| 2009/0310664 A1 * | 12/2009 | Yannone | 375/228 |
| 2010/0156697 A1 * | 6/2010 | Yannone | 342/29 |
| 2010/0207762 A1 * | 8/2010 | Lee et al. | 340/541 |

FOREIGN PATENT DOCUMENTS

| | | |
|---|---|---|
| WO | WO 2006135416 A2 * | 12/2006 |
| WO | WO 2007065879 A1 * | 6/2007 |
| WO | WO 2008051204 A2 * | 5/2008 |

* cited by examiner

QUANTITY SMOOTHER

CLAIM OF PRIORITY

The present application is a Continuation In Part of copending U.S. patent application Ser. No. 12/364,480, filed Feb. 2, 2009, which application claims priority to U.S. Provisional Application Ser. Nos. 61/063,251, 61/063,290, 61/063,271 and 61/063,207, filed on Jan. 31, 2008. All of the foregoing applications are incorporated herein by reference in their entireties.

STATEMENT OF GOVERNMENT INTEREST

The invention was made with United States Government support under Contract No. N00019-02-C-3002. Accordingly, the United States Government has certain rights in this invention.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

In an embodiment, a quantity smoother includes a first stage and a second stage. The first stage is operable to receive a sequence of raw samples of a quantity, and to generate from the raw samples intermediate samples of the quantity, the sequence of intermediate samples having a reduced level of fluctuation relative to the sequence of raw samples. And the second stage is operable to generate from the intermediate samples smoothened samples of the quantity, the sequence of smoothened samples having a reduced level of fluctuation relative to the sequence of intermediate samples.

For example, such a quantity smoother may be part of a target-ranging system on board a fighter jet. A ranging portion of the system may recursively estimate the range of the target from the jet and generate samples of a raw error in the range estimate. And the smoother may smoothen the raw-error samples so that the fighter pilot may more quickly determine from the samples a range window within which the target lies.

DETAILED DESCRIPTION

Figure 1:
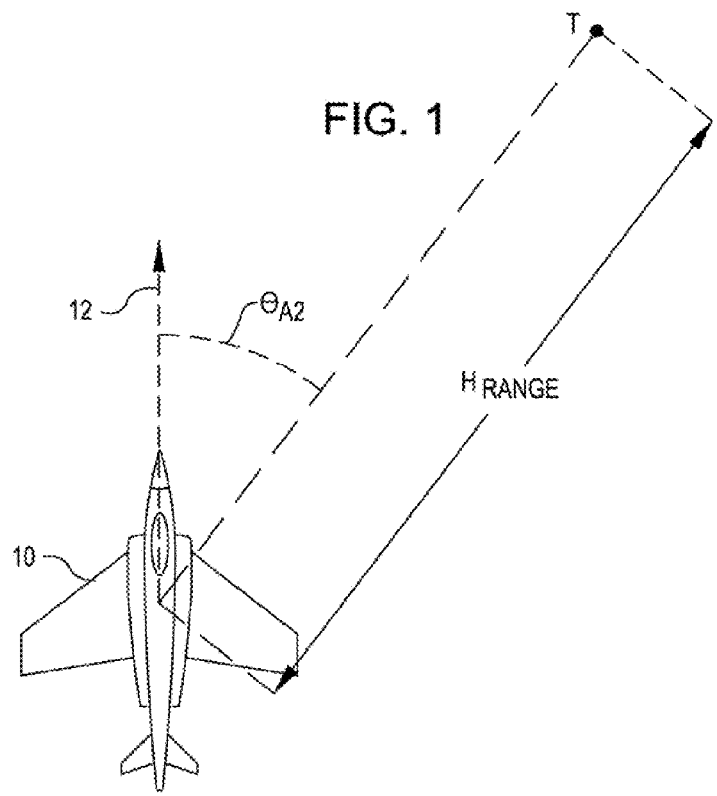
FIG. 1 is an overhead view of a fighter jet and a target.

FIG. 1 is an overhead view of a fighter jet 10 traveling at a heading 12 and at a level altitude, and of a target T, which may be airborne, ground based, moving, or stationary. The target T is located at an azimuth angle $\theta_{AZ}$ from the heading 12 and at an azimuth range $H_{RANGE}$ from the jet 10.

Figure 2:
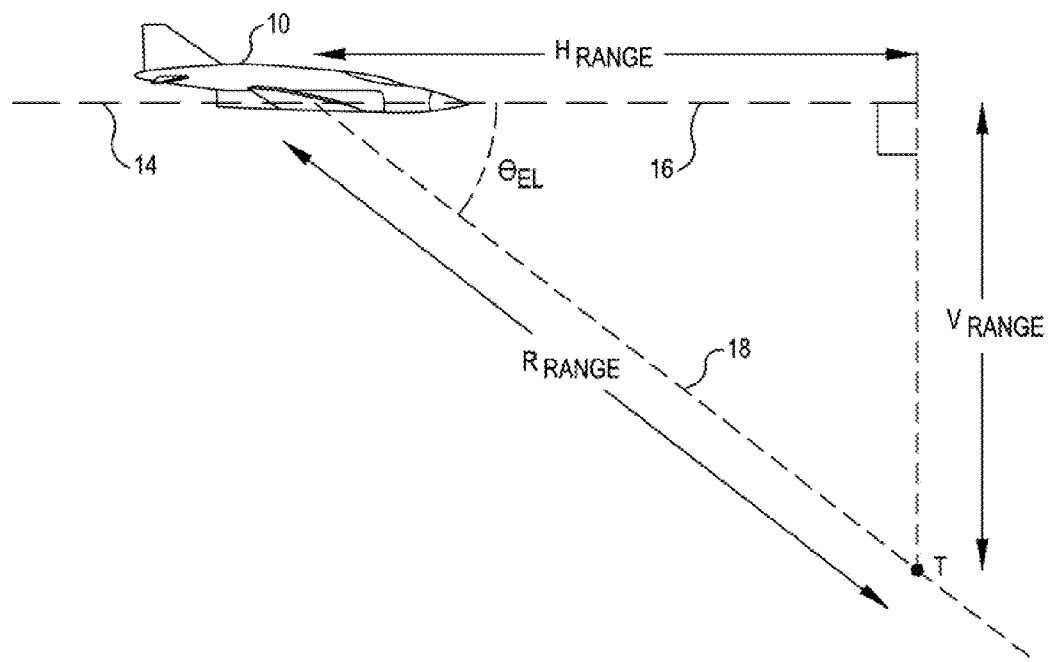
FIG. 2 is a side elevation view of the fighter jet and target of FIG. 1.

FIG. 2 is a side elevation view of the fighter jet 10 and the target T of FIG. 1. The target T is located at an elevation angle $\theta_{EL}$ from the jet azimuth plane 14, at a vertical distance $V_{RANGE}$ from the jet 10, and at an actual range $R_{RANGE}$ from the jet.

Geometrically speaking, the target T lies in an elevation plane which is perpendicular to the jet azimuth plane 14 and which includes the straight line 16 along which $H_{RANGE}$ is measured. For example, in this embodiment, the elevation plane may be coincident with the page of FIG. 2.

Referring to FIGS. 1 and 2, the fighter jet 10 typically includes a targeting system (not shown in FIGS. 1 and 2) for detecting the target T, and for determining one or more of the following targeting parameters: $\theta_{AZ}$, $\theta_{EL}$, $R_{RANGE}$, $H_{RANGE}$, and $V_{RANGE}$. For example, the targeting system may actively detect and range (i.e., determine $R_{RANGE}$ for) the target T by transmitting a signal (e.g., a radar signal) that impinges upon, and that is reflected back to the jet 10 by, the target T, and by receiving the reflected signal with a directional antenna (not shown in FIGS. 1 and 2). The targeting system may then determine $\theta_{AZ}$ and $\theta_{EL}$ by analyzing the phase of the received signal at each of multiple elements of the antenna. Alternatively, the targeting system may passively detect and range the target T by similarly analyzing a signal emitted by the target T to determine $\theta_{AZ}$ and $\theta_{EL}$. Passive detection may be useful when the pilot of the fighter jet 10 does not want to alert the personnel manning the target T to the jet's presence, or when the target is a "pop-up" target (e.g., a hand-held rocket launcher) that is difficult or impractical to actively detect. Because such target detecting and ranging systems are known, the details of such a system are omitted for brevity.

Referring again to FIG. 2, although the target detecting and ranging system onboard the fighter jet 10 can determine from $\theta_{AZ}$ and $\theta_{EL}$ that the target T lines along a straight-line path 18, the system cannot determine from these angles alone a value for $R_{RANGE}$, $H_{RANGE}$, or $V_{RANGE}$.

Therefore, the targeting system onboard the jet 10 needs additional information to determine at least one of $R_{RANGE}$, $H_{RANGE}$, and $V_{RANGE}$. Once the targeting system determines a value for at least one of these parameters, it can determine the value for the remaining ones of these parameters via a trigonometric identity such as the law of sines.

For example, a targeting system employing passive detection may obtain this additional information by comparing a signature of a signal emitted from the target T with signal signatures that are stored in a database. If the signature of the emitted signal matches a signature in the database, then the targeting system may be able to identify the target T, and may be able to retrieve from the database information describing the target or the emitted signal. For example, if the database includes a lookup table that effectively plots distance vs. signal-to-noise-ratio (SNR) for the emitted signal, then the targeting system may calculate a value for $R_{RANGE}$ by measuring the SNR of the emitted signal at the fighter jet 10 and obtaining a value for $R_{RANGE}$ from the lookup table.

Alternatively, if the target detecting and ranging system determines that the target T is a type of ground-based target (e.g., a tank or rocket launcher), then, if the target is at sea level, $V_{RANGE}$ is substantially equal to the altitude of the fighter jet 10—because the altitude is measured by an altimeter (not shown in FIGS. 1-2) on board the jet, the targeting system has access to the altitude. Once the targeting system has a value for $V_{RANGE}$, the system can calculate values for $H_{RANGE}$ and $R_{RANGE}$ using, for example, the law of sines.

In yet another alternative, the targeting system may instruct the pilot to manoeuvre the jet 10 so as to significantly change at least the azimuth angle $\theta_{AZ}$ from measurement point to measurement point, and then locate T at the intersection of the multiple $H_{RANGE}$ lines at these different angles $\theta_{AZ}$. Such a technique is described in U.S. Pat. No. 7,132,961 which is incorporated by reference.

In still another alternative, the targeting system may obtain azimuth and elevation angles $\theta_{AZ2}$ and $\theta_{EL2}$ from a second object, such as a second fighter jet, and determine the location of the target T using $\theta_{AZ2}$ and $\theta_{EL2}$ from the second object and $\theta_{AZ}$ and $\theta_{EL}$ from the jet 10. Such a technique is described in U.S. patent application Ser. No. 12/364,480, which is incorporated by reference.

With any of the above-described targeting techniques, the targeting system may calculate one or more of the target parameters $\theta_{AZ}$, $\theta_{EL}$, $R_{RANGE}$, $H_{RANGE}$, and $V_{RANGE}$ recursively over a period of time. Taking $R_{RANGE}$ for example, the targeting system may calculate an initial sample for $R_{RANGE}$ that has a value of relatively low accuracy, and then may calculate successive samples for $R_{RANGE}$ using one or more of the previous samples such that over a period of time (e.g., 1-60 seconds) the samples of $R_{RANGE}$ converge toward a steady-state value that has a higher accuracy, for example, an accuracy within approximately ±5%.

In addition, the targeting system may calculate a percent parameter error (PPE) for one or more of these parameters. Taking $R_{RANGE}$ for example, the targeting system may calculate an initial sample of a percent range error (PRE) in $R_{RANGE}$, this initial sample having a relatively high value, and may then calculate successive samples of PRE, each of the samples of PRE corresponding to a respective sample of $R_{RANGE}$. Over a period of time (e.g., 1-60 seconds), as the samples of $R_{RANGE}$ converge toward a more accurate steady-state value, the samples of PRE converge toward a lower steady-state value. Therefore, an observer such as a pilot may interpret the convergence of the PRE samples toward a lower value as indicating that the samples of $R_{RANGE}$ are converging toward a more accurate value.

The targeting system may display to the pilot of the jet 10 the sequences of samples calculated for a targeting parameter and its corresponding PPE so that the pilot can use these samples to make a flight decision. For example, the pilot may monitor the samples of $R_{RANGE}$ and PRE to determine when the target T is in range of a missile with which the jet 10 is armed.

Because a pilot may have only a short period of time (e.g., a few seconds) to make a decision (e.g., evade or destroy) regarding a target T, the targeting system may provide to the pilot targeting parameters and corresponding PPEs that are sufficient to allow the pilot to make an informed decision within a specified time.

It is theorized that a pilot can more confidentially make mental calculations involving the parameter and PPE samples, and thus can more quickly make decisions based on the parameter and PPE samples, if at least the PPE samples converge toward a steady-state value in a smooth and relatively monotonic manner. Referring to Table I, an example of $R_{RANGE}$ and PRE converging smoothly and monotonically is discussed.

TABLE I

| Time | $R_{RANGE}$ (nautical miles) | PRE (%) | Approximate Range Window (nautical miles) |
|---|---|---|---|
| $T_0$ | 30 | ±50 | 15-45 |
| $T_1$ | 27 | ±35 | 18-36 |
| $t_2$ | 25 | ±25 | 19-31 |
| $t_3$ | 23 | ±17 | 19-27 |
| $t_4$ | 22 | ±10 | 20-24 |

In this example, the jet 10 is carrying a missile with a range of 25 nautical miles, and the pilot would like to fire the missile at the target T as soon as the target is in range.

So, at an initial time $t_0$, the targeting system displays an initial value of 30 nautical miles for $R_{RANGE}$, and an initial PRE of ±50%. This allows the pilot to mentally calculate that the target T is within a range window that is between approximately 15 and 45 nautical miles from the jet 10. Because this range window extends beyond the missile range of 25 nautical miles, the pilot realizes that if he fires the missile at this time, then the missile may be unable to reach and destroy the target T.

Similarly, at a second time $t_1$, the targeting system displays a value of 27 nautical miles for $R_{RANGE}$, and a PRE of ±35%. This allows the pilot to mentally calculate that the target T is between approximately 18 and 36 nautical miles from the jet 10. Because this range window extends beyond the missile range of 25 nautical miles, the pilot realizes that if he fires the missile at this time, then the missile may be unable to reach and destroy the target T. But the pilot has information sufficient to realize that the maximum range is getting smaller (a decrease from 45 to 36 nautical miles).

At a third time $t_2$, the targeting system displays a value of 25 nautical miles for $R_{RANGE}$, and a PRE of ±25%. This allows the pilot to mentally calculate that the target T is between approximately 18 and 31 nautical miles from the jet 10. Because this range window extends beyond the missile range of 25 nautical miles, the pilot continues to realize that he should not yet fire the missile. But the pilot also has information sufficient to see that the maximum range is continuing to get smaller (a decrease from approximately 36 to 31 nautical miles).

At a fourth time $t_3$, the targeting system displays a value of 23 nautical miles for $R_{RANGE}$, and a PRE of ±17%. This allows the pilot to mentally calculate that the target T is between approximately 19 and 27 nautical miles from the jet 10. Because this range window still extends beyond the missile range of 25 nautical miles, the pilot continues to realize that he should not yet fire the missile. But the pilot has information sufficient to see that the maximum range continues to get smaller (a decrease from approximately 31 to 27 nautical miles).

Finally, at a fifth time $t_4$, the targeting system displays a value of 22 nautical miles for $R_{RANGE}$, and a PRE of ±10%. This allows the pilot to mentally calculate that the target T is between approximately 20 and 24 nautical miles from the jet 10. Because the maximum value of this range window is less than 25 nautical miles, and because the range window has converged relatively smoothly and monotonically from $t_0$-$t_4$, the pilot has information sufficient to be confident that the target T is in range of the missile, and that he can now fire the missile.

Unfortunately, a targeting system may generate target parameter and/or PPE samples that do not converge to respective steady-state values relatively smoothly and monotonically, and this uneven convergence may potentially increase the time required by a pilot to make a decision regarding a target.

That is, the targeting system may generate target parameter and/or PPE samples that oscillates (sometimes wildly) until they eventually converge toward a steady-state value. For example, such oscillating in the PRE samples may cause the window for $R_{RANGE}$ to grow significantly, then shrink significantly, then grow significantly, and so on. As an analogy, in this example the target system is generating the PRE samples in an under-damped manner, such that the PRE samples "ring," much like an electrical signal generated by a circuit with an under-damped transient response may "ring."

And this oscillation of the target parameter and/or PPE samples may make it more difficult for the pilot to make mental calculations involving these samples, and may increase the time before the pilot feels confident that a particular target parameter is within a particular window (e.g., that the target parameter $R_{RANGE}$ is within a window that indicates that the target is within the range of a missile).

Figure 3:
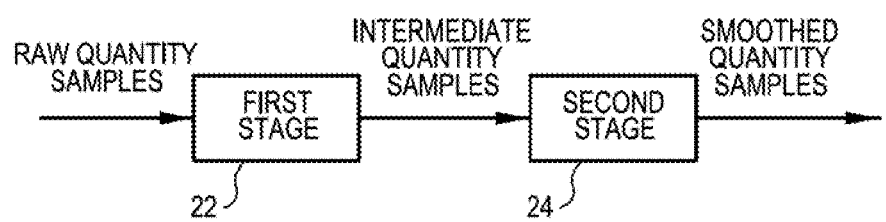
FIG. 3 is a block diagram of an embodiment of a quantity smoother.

FIG. 3 is a block diagram of an embodiment of a quantity smoother 20, which operates to reduce or eliminate the oscillation in the samples of at least one quantity such that the samples converge smoothly and monotonically toward a steady-state value. For example, the quantity smoother 20 may reduce the oscillation in PRE samples such that a pilot may more quickly determine that a target is within missile-firing range or that a target is still far enough away for the pilot to take evasive action.

The quantity smoother 20 includes a first stage 22 and a second stage 24.

The first stage 22 receives a stream of raw quantity samples, and generates from the raw samples a stream of intermediate samples that have a lower level of oscillation than the raw samples. For example, the first stage 22 may be a low-pass type of filter having a latency. Generally, the latency is the number of samples received by the first stage 22 before the first stage generates a first intermediate sample, and is dependent on the filtering algorithm. In an embodiment, the first stage 22 may be a median filter as discussed below in conjunction with FIGS. 4-9.

The second stage 24 receives the stream of intermediate samples from the first stage 22, and generates from the intermediate samples a stream of smoothened samples that have a lower level of oscillation than the intermediate samples, and that are more monotonic than the stream of raw samples. For example, the second stage 24 may be a curve fitter that fits the intermediate samples to one or more curves, that generates the smoothened samples from the one or more curves, and that has a latency. In an embodiment, the second stage 24 fits received samples to one or more fifth-order polynomials as discussed below in conjunction with FIGS. 4-9.

Still referring to FIG. 3, alternate embodiments of the quantity smoother 20 are contemplated. For example, although described as having two stages, the smoother 20 may have more or fewer than two stages, and these stages may each operate according to any algorithm suitable to aid in sample smoothing. Furthermore, although shown coupled in series, the stages of the smoother 20 may be coupled in parallel, or some of the stages may be coupled in parallel, and some of the stages may be coupled in series.

Figure 4:
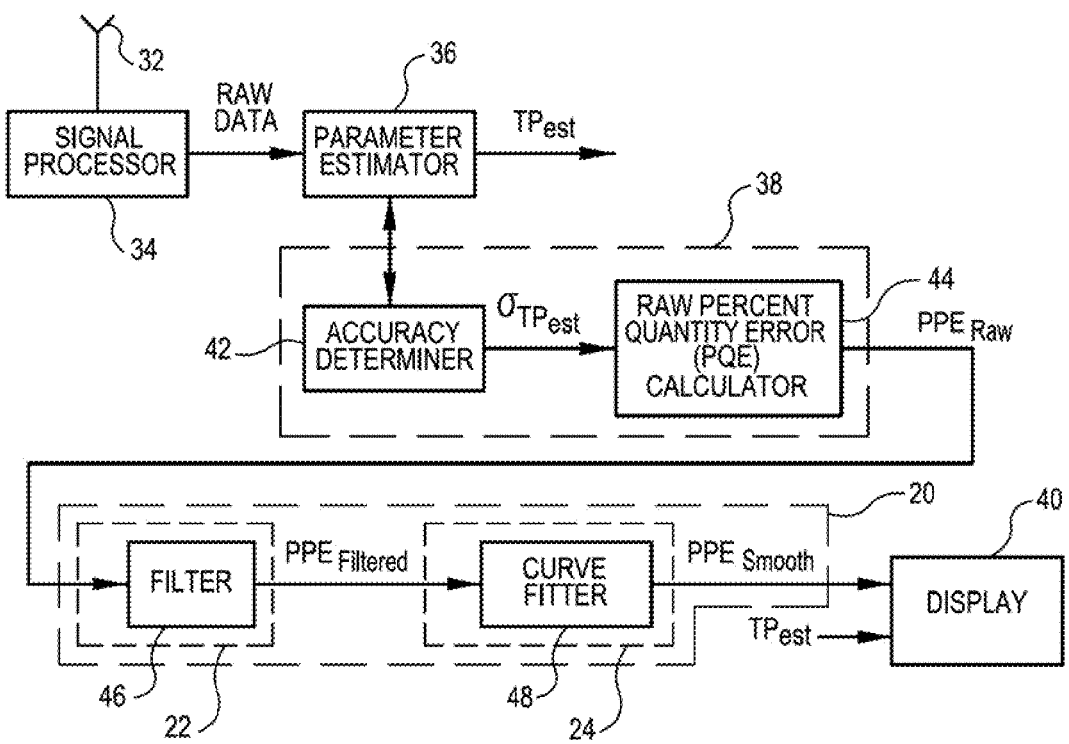
FIG. 4 is block diagram of an embodiment of a targeting system for a vehicle such as the fighter jet of FIGS. 1-2, the target system including an embodiment of the quantity smoother of FIG. 3.

FIG. 4 is a block diagram of an embodiment of a targeting system 30 that includes an embodiment of the quantity smoother 20 of FIG. 3. The quantity smoother 20 allows the targeting system 30 to generate for at least one target parameter or PPE samples that converge toward a respective steady-state value relatively smoothly and monotonically, that is, with reduced oscillation (i.e., "ringing"), or with increased damping, as compared to prior targeting systems. For purposes of illustration and brevity, the targeting system 30 is described as generating a single stream dampened PPE samples, it being understood that the targeting system may generate multiple streams of dampened samples for multiple PPEs, and may generate one or more streams of dampened samples for one or more target parameters, in a similar manner.

In addition to the quantity smoother 20, the targeting system 30 includes an antenna 32, signal processor 34, quantity estimator 36, a raw-percent-error determiner 38, and a display 40.

The targeting system 30 may be disposed in one of a variety of locations. For example, the system 30 may be disposed in a vehicle such as a fighter jet, tank, ship, or space craft, in a portable base station such as a portable missile launcher, or in a permanent base station.

The antenna 32 is operable to receive at least one signal that carries information indicative of a location of a target. If the targeting system 30 is actively detecting and ranging a target, such signals may include radar signals that are reflected by the target to the antenna 32. These radar signals may originate from the antenna 32 or from another antenna (not shown) associated with the targeting system 30, such as another antenna mounted to the vehicle in which the targeting system is disposed. In contrast, if the targeting system 30 is passively detecting and ranging a target, such signals may include signals that are emitted from or reflected by the target itself. Antennas suitable for use as the antenna 32, and techniques for actively and passively detecting and ranging a target, are known. An example of a known technique for passively detecting and ranging a target is disclosed in U.S. Pat. No. 7,132,961, which is incorporated by reference.

The signal processor 34 extracts from the at least one signal received by the antenna 32 information indicative of the location of the target, and converts this information into raw data. For example, the signal processor 34 may determine the instantaneous azimuth and elevation angles $\theta_{AZ}$ and $\theta_{EL}$ at which the received signal is incident to the antenna 32, may determine the type and instantaneous strength of the signal, and then may convert the angles, signal type, and signal strength into raw data samples. The signal processor 34 may also determine the altitude of the vehicle carrying the targeting system 30, and convert the altitude into additional raw data samples. The signal processor 34 may continually process the received signal and determine the vehicle altitude over a period of time, and periodically update the raw data samples. For example, the signal processor 34 may generate raw data samples for the azimuth angle, the elevation angle, the signal strength, and the vehicle altitude once every second. Furthermore, the signal processor 34 may be implemented in hardware, software, or in both hardware and software.

The parameter estimator 36 estimates from the raw data a stream of samples for one or more estimated target parameters $TP_{est}$. Examples of such estimated target parameters $TP_{est}$ include azimuth angle, elevation angle, horizontal range, vertical range, and actual range. The parameter estimator 36 may be implemented in hardware, software, or in both hardware and software.

The parameter estimator 36 may estimate the $TP_{est}$ samples recursively, and this recursive estimation may cause the samples to oscillate as discussed above.

For example, the parameter estimator 36 may estimate a first set of X, Y, Z coordinates for the target based on a first set of raw data from the signal processor 34, and then generate an estimated sample for target parameter $R_{RANGE}$ (range to target) based on this first set of coordinates.

Next, the estimator 36 may estimate a second set of X,Y,Z coordinates for the target based on a second set of raw data samples from the processor 34.

Then, the estimator 36 may estimate a first hybrid set of X, Y, Z coordinates based on the first and second sets of coordinates. For example, the estimator 36 may average the first and second sets of coordinates to generate the first hybrid set of coordinates, although the estimation algorithm may be more complicated than this.

Next, the estimator 36 generates a second estimated sample of $R_{RANGE}$ based on the first hybrid set of coordinates.

Then, the parameter estimator 36 generates subsequent estimated samples for $R_{RANGE}$ taking into account the current set of estimated target coordinates X, Y, Z and at least some of the previous sets of estimated coordinates X, Y, Z.

These subsequent estimated samples for $R_{RANGE}$ eventually converge toward or to a steady-state value of $R_{RANGE}$, the accuracy of which depends on the error introduced by the antenna 32, the channel over which the signal received by the antenna propagates, the processor 34, and the estimator 36. Of course if the target system 30 is in a moving vehicle, if the ranged target is moving, or if both the vehicle carrying the target system and the ranged target are moving relative to each other, then the steady-state value of $R_{RANGE}$ will change based on this movement, but with reduced or no oscillation after the convergence period.

There are conventional algorithms that the parameter estimator 36 may employ to estimate target parameters. For example, U.S. Pat. No. 7,132,961, which is incorporated by reference, discusses a target-parameter estimator that employs a Kalmann algorithm.

Still referring to FIG. 4, the raw-error determiner 38 estimates for each stream of $TP_{est}$ samples a respective stream of samples for the raw percentage parameter error ($PPE_{Raw}$) in each $TP_{est}$. That is, each sample of a $PPE_{Raw}$ stream corresponds to a respective sample of a respective $TP_{est}$ stream. The determiner 38 estimates each sample of a $PPE_{Raw}$ stream from the corresponding sample of a corresponding $TP_{est}$ stream and from information representative of the errors introduced into the $TP_{est}$ samples by, for example, the antenna 32, the channel over which the signal received by the antenna propagates, the processor 34, and the estimator 36. Furthermore, the raw-error determiner 38 may be implemented in hardware, software, or both hardware and software.

More specifically, the raw-error determiner 38 includes an accuracy determiner 42 and a raw-percent-parameter-error (PPE) calculator 44.

For each sample in a stream of $TP_{est}$ samples, the accuracy determiner 42 determines a respective 1-sigma sample $\sigma_{TPest}$, which is the statistical standard deviation for the corresponding sample of $TP_{est}$. Therefore, the determiner 42 generates a stream of samples of $\sigma_{TPest}$, where each sample corresponds to a respective sample of $TP_{est}$. Algorithms and techniques for calculating the $\sigma_{TPest}$ samples are known, and, therefore, further discussion of the calculation of the $\sigma_{TPest}$ samples is omitted for brevity.

For each sample of $\sigma_{TPest}$, the raw PPE calculator 44 calculates a corresponding sample of $PPE_{Raw}$ according to the following equation:

$$PPE_{Raw} = 100 \cdot \sigma_{TPest} / TP_{est} \quad\quad 1)$$

Still referring to FIG. 4, the quantity smoother 20 smoothens the $PPE_{Raw}$ samples by reducing or eliminating the oscillation in these samples. That is, the smoother 20 acts to dampen this oscillation in a manner similar to that discussed above in conjunction with FIG. 3. Furthermore, the quantity smoother 20 may be implemented in hardware, software, or both hardware and software.

In an embodiment, the first stage 22 of the quantity smoother 20 includes a filter 46, and the second stage 24 includes a curve fitter 48.

The filter 46 receives the $PPE_{Raw}$ samples from the error determiner 38, and generates from these samples a stream of samples $PPE_{Filtered}$, which converge toward a steady-state value more smoothly and more monotonically than the $PPE_{Raw}$ samples. For example, the filter 46 may be a median filter. The operation of an embodiment of the filter 46 is discussed below in conjunction with FIG. 6.

The curve fitter 48 receives the samples $PPE_{Filtered}$, and generates from these samples a stream of samples $PPE_{Smooth}$, which converge toward a steady-state value even more smoothly and more monotonically than the $PPE_{Filtered}$ samples do. The curve fitter 48 does this by fitting the $PPE_{Filtered}$ samples to one or more known curves, and by then generating the $PPE_{Smooth}$ samples from this curve/these curves.

More specifically, in an embodiment, in response to each sample of $PPE_{Filtered}$ from the filter 46, the curve fitter 48 fits this and all previous samples of $PPE_{Filtered}$ to a best-fit curve, and then generates a sample of $PPE_{Smooth}$ from this curve, this sample of $PPE_{Smooth}$ corresponding to the most recent sample of $PPE_{Filtered}$. Because the best-fit curve may be different for each sample of $PPE_{Filtered}$, the curve fitter 48 may fit each sample to a different curve. For example, where it is known that the $PPE_{Raw}$ samples converge approximately according to a decaying exponential, then the curve fitter 48 may fit the values of $PPE_{Filtered}$ to a fifth-order polynomial. In response to each sample of $PPE_{Filtered}$, the curve fitter 48 may alter the coefficients of this polynomial to achieve the best curve fit. The operation of an embodiment of the curve fitter 48 is discussed below in conjunction with FIG. 8.

The display 40 successively displays to the pilot (or other observer) each sample of $TP_{est}$ with a corresponding sample of $PPE_{Smooth}$, for example, in a display format similar to that of Table I above. That is, the display 40 displays to the pilot the most recent sample of $TP_{est}$ and the corresponding most recent sample of $PPE_{Smooth}$, and updates these samples as they are generated by the quantity estimator 36 and the quantity smoother 20, respectively—of course the targeting system may have to delay the $TP_{est}$ samples to account for the latency of the quantity smoother 20. This allows the pilot to perceive the $PPE_{Smooth}$ values converging toward a steady-state value relatively monotonically and with little or no oscillation, and thus may allow the pilot to more quickly determine when the value of $TP_{est}$ is within a particular window (for example, when a range to a target indicates that the target is within missile range).

Still referring to FIG. 4, alternate embodiments of the targeting system 30 are contemplated. For example, as mentioned above, although shown as smoothing only a single stream of $PPE_{Raw}$ samples, the system 30 may smoothen additional streams of $PPE_{Raw}$ samples, may smoothen one or more streams of $TP_{est}$ samples, or may smoothen streams of $PPE_{Raw}$ samples and $TP_{est}$. Furthermore, the quantity smoother 20 may be designed as part of the original targeting system 30, or may be installed as an add-on to an existing targeting system.

Referring to FIGS. 5-9, the operation of an embodiment of the targeting system 30 of FIG. 4 is discussed where the system is disposed on a fighter jet such as the fighter jet 10 of FIGS. 1-2, and where the system estimates the range to a target and the percentage error in the estimated range.

Figure 5:
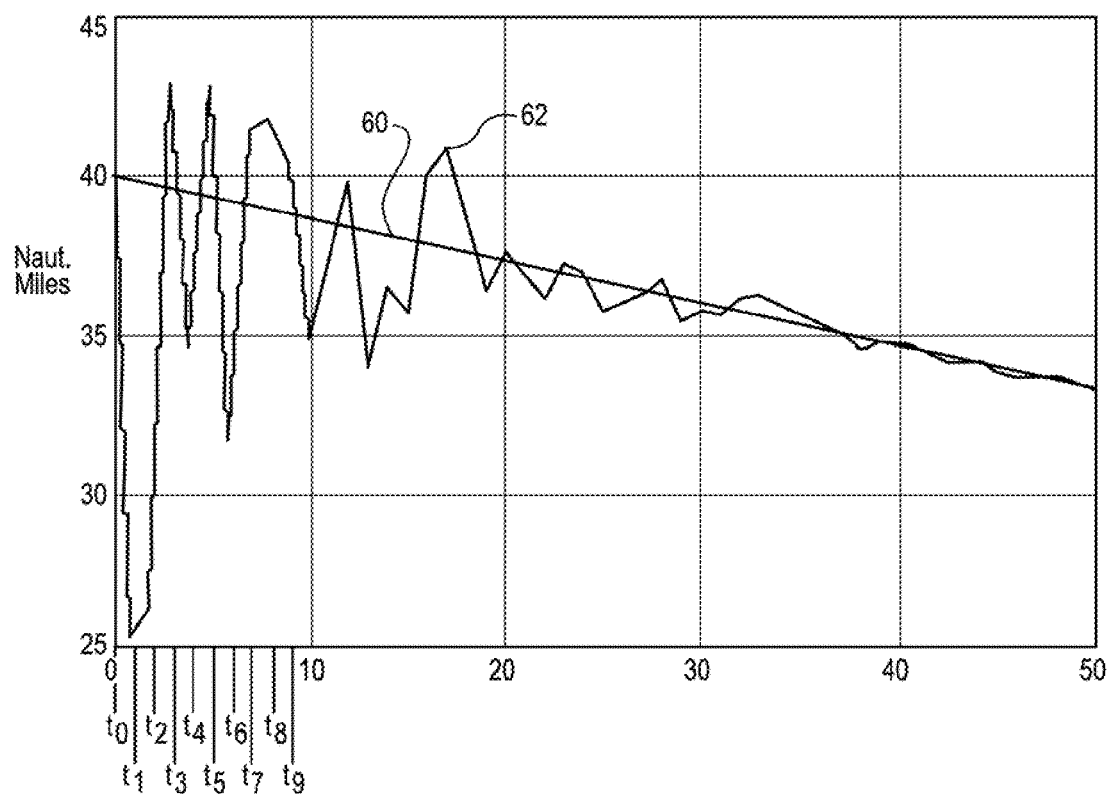
FIG. 5 is a time plot of an actual range to a target and of an estimated range to the target, the estimated range calculated by an embodiment of the target into system of FIG. 4.

FIG. 5 is a time plot of an actual range 60 of a target (not shown in FIG. 5) and a range ($R_{Range\_est}$) 62 of the target as estimated by an embodiment of the parameter estimator 36 of FIG. 4.

Figure 6:
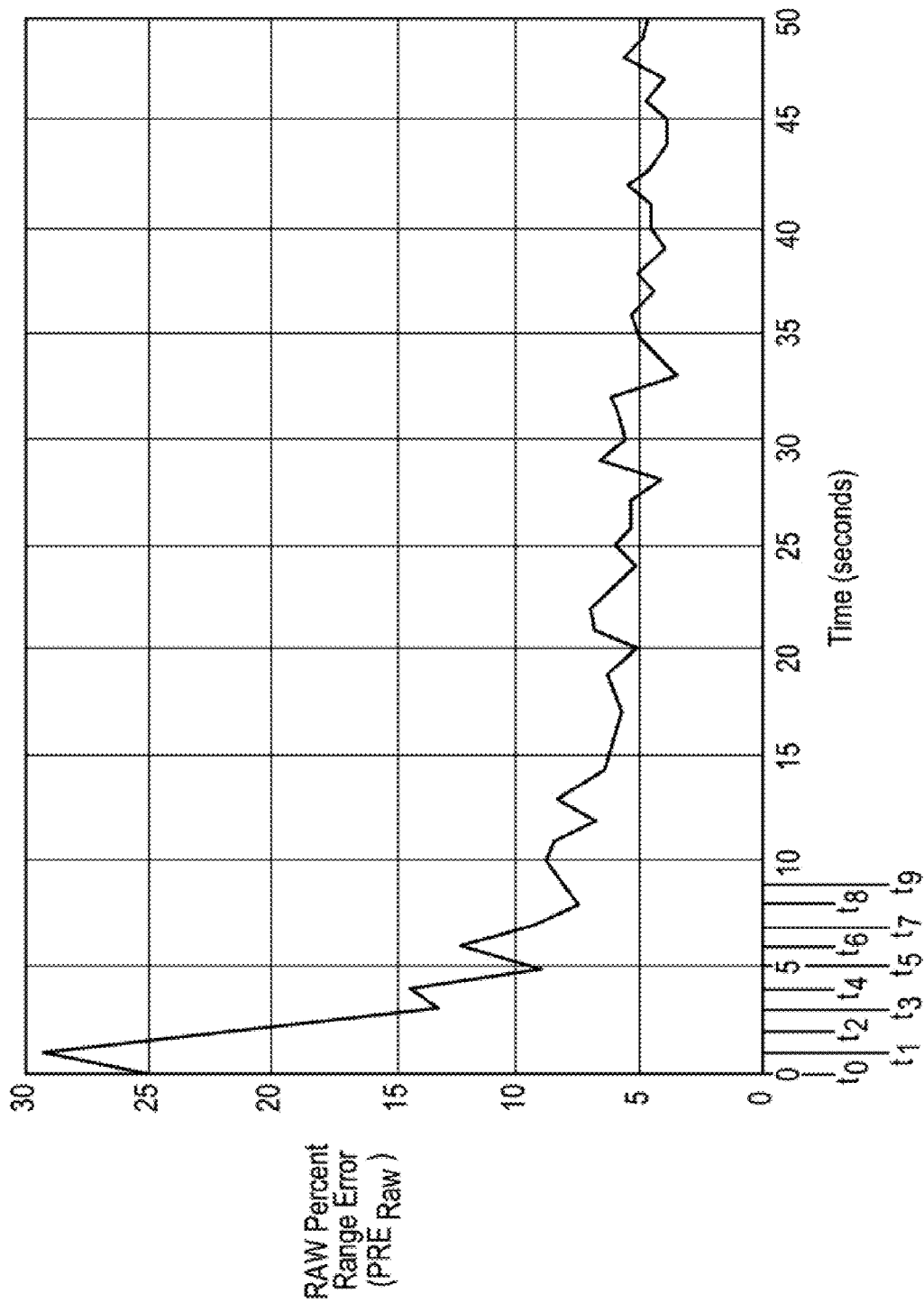
FIG. 6 is a time plot of the raw percentage-range-error ($PRE_{Raw}$) in the estimated range of FIG. 5, $PRE_{Raw}$ calculated by an embodiment of the targeting system of FIG. 4.

FIG. 6 is a time plot of the raw percentage range error ($PRE_{Raw}$) in $R_{Range\_est}$ (FIG. 5) as calculated by an embodiment of the error determiner 38 of FIG. 4.

Figure 7:
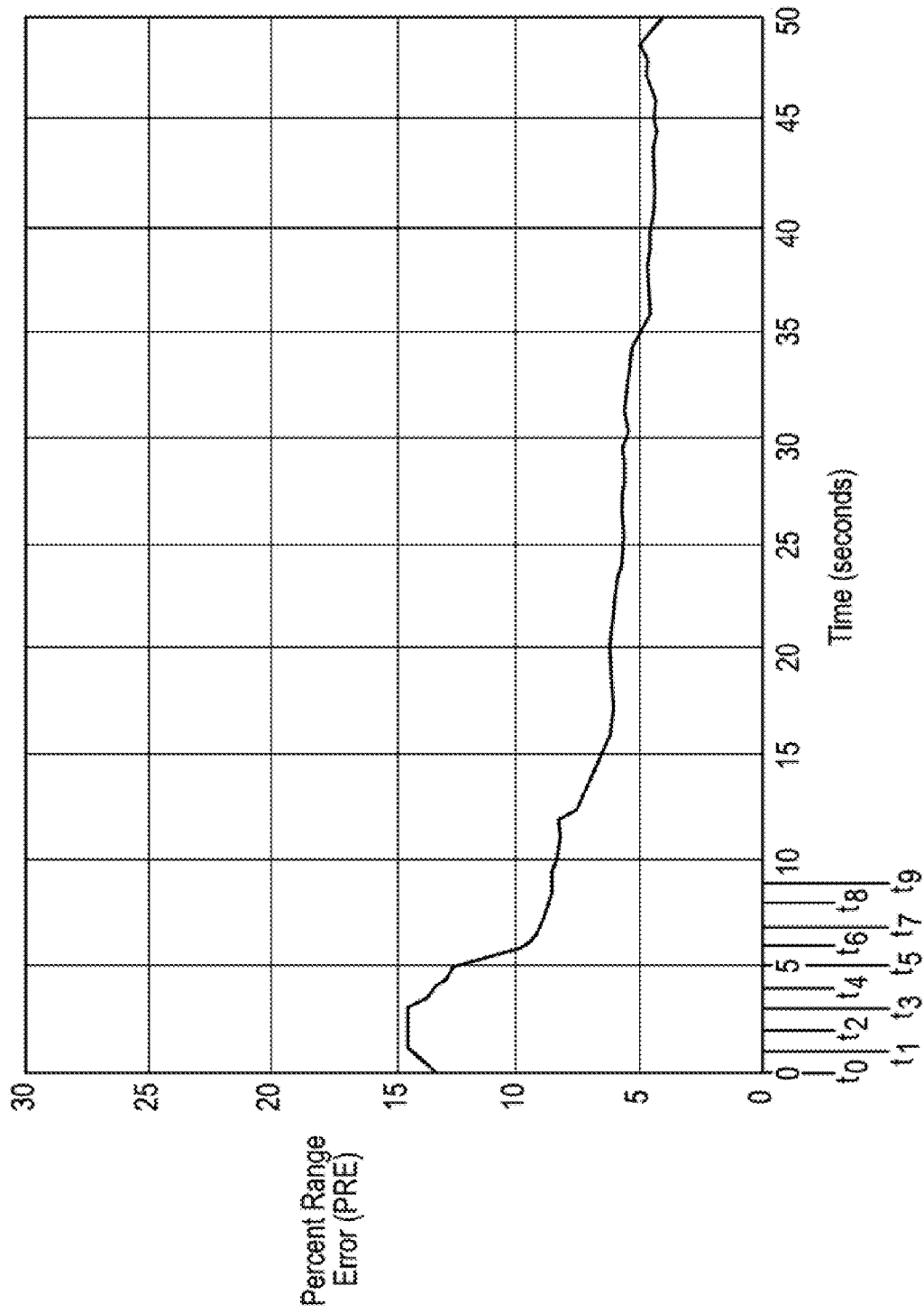
FIG. 7 is a time plot of $PRE_{Raw}$ of FIG. 6 smoothened by the first stage of an embodiment of the quantity smoother of FIG. 4.

FIG. 7 is a time plot of the filtered raw percent range error (PRE Filtered) as generated by an embodiment of the first-stage filter 46 of FIG. 4.

Figure 8:
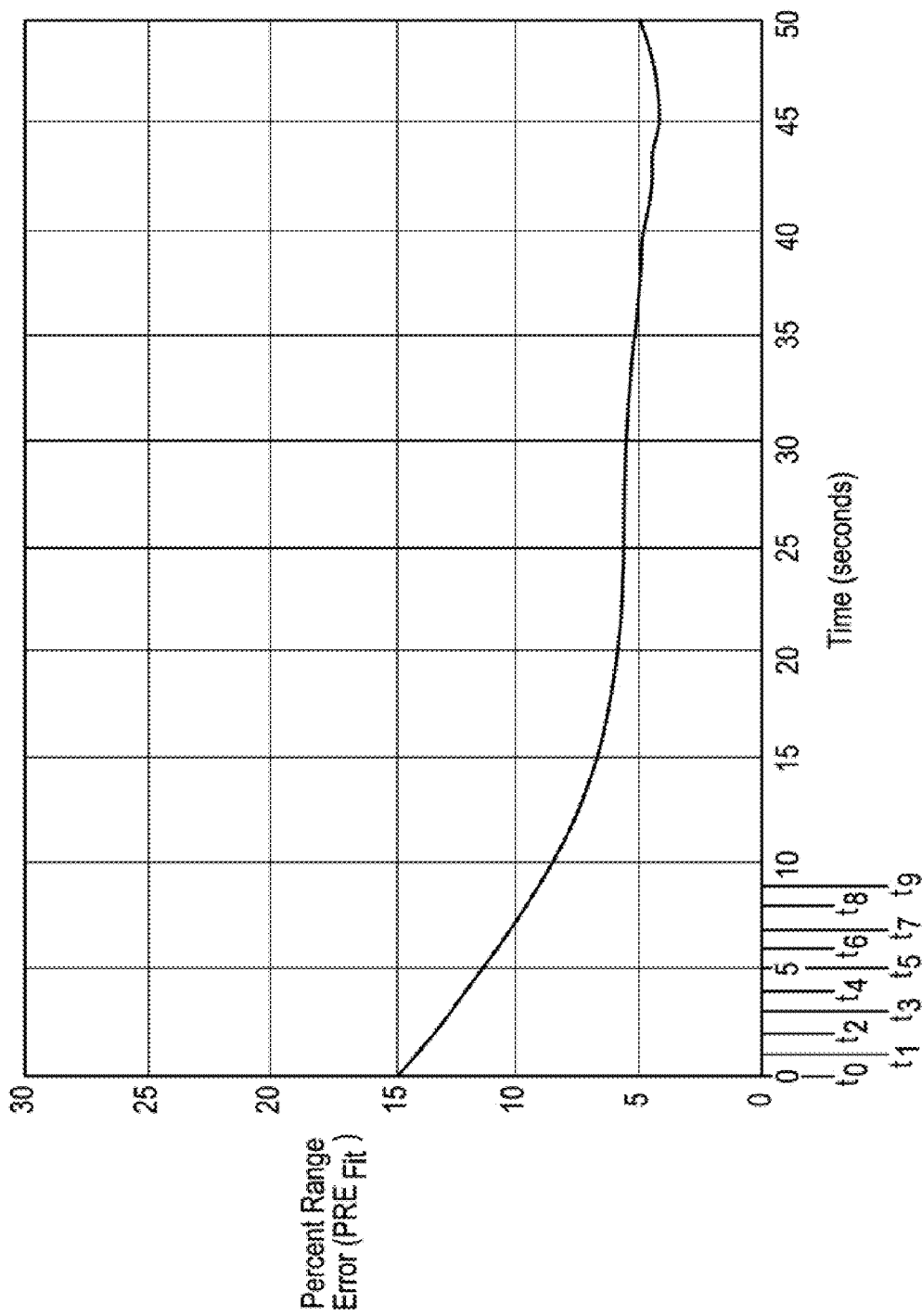
FIG. 8 is a time plot of the smoothened $PRE_{Raw}$ of FIG. 7 further smoothened by the second stage of an embodiment of the quantity smoother of FIG. 4.

FIG. 8 is a time plot of the smoothened filtered raw percent range error ($PRE_{Smooth}$) as generated by an embodiment of the second-stage curve fitter 48 of FIG. 4.

Figure 9:
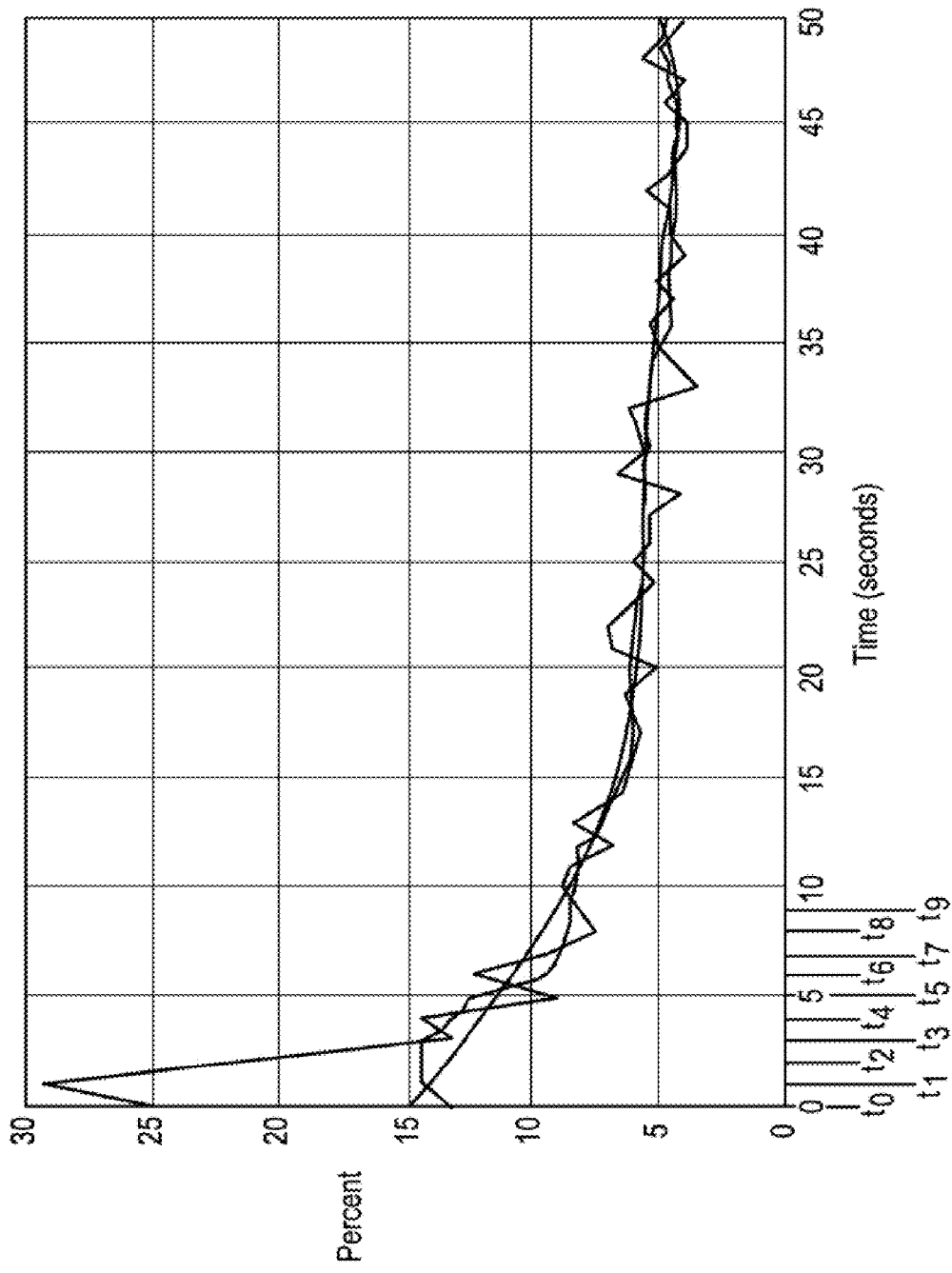
FIG. 9 is time plot that includes the time plots of FIGS. 6-8 overlaying one another.

FIG. 9 is an overlay of the plots of FIGS. 6-8.

Referring to FIGS. 4 and 5, the parameter estimator 36 begins generating samples of $R_{Range\_est}$ (plot 62) at time $t_0$ (t=0) seconds, and, in this embodiment, subsequently generates a new sample $t_n$ (t=n) once every second. The samples of $R_{Range\_est}$ converge substantially to the actual range (plot 60) after about forty seconds. But as discussed above, in some circumstances a pilot may need to make a decision (e.g., destroy the target, evade the target) regarding the ranged target within a time that is significantly less than forty seconds, for example, within ten seconds.

Referring to FIGS. 4 and 6, the error determiner 38 also begins generating samples of $PRE_{Raw}$ at time $t_0$, and, in this embodiment, subsequently generates a new sample every second. Although these samples converge toward a steady-state value of approximately 5%, they do so non-monotonically, and they continue to oscillate even at fifty seconds, which may be beyond the time within which the pilot would like to make a decision regarding the target.

Referring to FIGS. 4 and 7, the filter 46 generates samples of $PRE_{Filtered}$ every second. One can see that the samples of $PRE_{Filtered}$ are more monotonic and barely oscillate as compared to the samples of $PRE_{Raw}$, (FIG. 6).

Referring to FIGS. 4, 6, and 7, the operation of an embodiment of the filter 46 is described where the filter implements a one-dimensional median-filter function.

A one-dimensional median filter may include two or more parallel first-in-first-out (FIFO) buffers each having a length L. The samples to be filtered are shifted into the first FIFO one at a time such that the sample to be filtered is at the center location of the first FIFO if L is an odd number, and the sample to be filtered is in one of the two center locations of the first FIFO if L is an even number. For samples at the beginning or end of a sample stream, zeros may be used to fill the empty locations of the FIFO. Next, the samples are reordered from lowest to highest value and then parallel loaded from the first FIFO into the second FIFO. The filtered sample generated by the filter 46 equals the sample in the center location of the second FIFO if L is an odd number, and equals the average of the two samples in the two center locations of the second FIFO if L is an even number. Then, the next sample is shifted into the first FIFO, and the procedure repeats.

For example purposes, the operation of an embodiment of the filter 46 is discussed in which: the filter 46 includes two parallel FIFO buffers having lengths L=7; the first FIFO is represented in the subsequent text by straight brackets; the second FIFO is represented in the subsequent text by curved brackets; and the first ten samples of $PRE_{Raw}$, (FIG. 6), rounded to the nearest integer, are decimal 26, 29, 23, 13, 14, 9, 12, 9, 7, and 8.

Initially, at sample time $t_3$, the first FIFO buffer is loaded from right to left with samples of $PRE_{Raw}$ as follows:

[0 0 0 26 29 23 13]

where the first sample (26) of $PRE_{Raw}$ is in the center location of the buffer, and the leftmost three buffer locations are loaded with zeros. There is a latency of three samples because it is not until the fourth sample time $t_3$ that the first sample (26) is in the center location of the first FIFO buffer. But the targeting system 30 (FIG. 4) makes this latency transparent to the pilot as discussed below in conjunction with FIG. 8. Furthermore, to avoid confusion, the plot of FIG. 7 has not been shifted in time to show this latency. Therefore, the sample of $PRE_{Filtered}$ at sample time $t_0$ in FIG. 7 corresponds to the samples of $R_{Range\_est}$ and $PRE_{Raw}$ at the time $t_0$ in FIGS. 5 and 6, respectively.

Next, these samples are reordered from lowest to highest and loaded into the second FIFO buffer as follows:

{0 0 0 13 23 26 29}

Then, the filter 46 generates the first sample of $PRE_{Filtered}$ equal to (13), which is the value of the sample in the center (fourth) location of the second FIFO buffer. This first sample (13) is plotted in FIG. 7 at sample time $t_0$ (as stated above, the plot of FIG. 7 has not been time shifted to show the latency introduced by the filter 46).

Next, at sample time $t_4$, the next sample of $PRE_{Raw}$ is right shifted into the first FIFO buffer, which, in response to this shift, has the following contents:

[0 0 26 29 23 13 14]

where the second sample (29) of $PRE_{Raw}$ is in the center location of the buffer, and the leftmost two buffer locations are loaded with zeros.

Then, these samples are reordered from lowest to highest and loaded into the second FIFO buffer as follows:

{0 0 13 14 23 26 29}

Next, the filter 46 generates the second sample of $PRE_{Filtered}$ equal to (14), which is the value of the sample in the center (fourth) location of the second FIFO buffer. This second sample (14) is plotted in FIG. 7 at time $t_1$.

Then, at sample time $t_5$, the next sample of $PRE_{Raw}$ is right shifted into the first FIFO buffer, which, in response to this shift, has the following contents:

[0 26 29 23 13 14 9]

where the third sample (23) of $PRE_{Raw}$ is in the center location of the buffer, and the leftmost buffer location is loaded with a zero.

Next, these samples are reordered from lowest to highest and are loaded into the second FIFO buffer as follows:

{0 9 13 14 23 26 29}

Then, the filter 46 generates the third sample of $PRE_{Filtered}$ equal to (14), which is the value of the sample in the center (fourth) location of the second FIFO buffer. This third sample (14) is plotted in FIG. 7 at $t_2$.

Next, at sample time $t_6$, the next sample of $PRE_{Raw}$ is right shifted into the first FIFO buffer, which, in response to this shift, has the following contents:

[26 29 23 13 14 9 12]

where the fourth sample (13) of $PRE_{Raw}$ is in the center location of the buffer.

Then, these samples are reordered from lowest to highest and are loaded into the second FIFO buffer as follows:

{9 12 13 14 23 26 29}

Next, the filter 46 generates the fourth sample of $PRE_{Filtered}$ equal to (14), which is the value of the sample in the center (fourth) location of the second FIFO buffer. This fourth sample 14 is plotted in FIG. 7 at $t_3$.

Then, at sample time $t_7$, the next sample of $PRE_{Raw}$ is right shifted into the first FIFO buffer, which, in response to this shift, has the following contents:

[29 23 13 14 9 12 9]

where the fifth sample (14) of $PRE_{Raw}$ is in the center location of the buffer.

Next, these samples are reordered from highest to lowest and are loaded into the second FIFO buffer as follows:

{9 9 12 13 14 23 29}

Then, the filter 46 generates the fifth sample of $PRE_{Filtered}$ equal to (13), which is the value of the sample in the center (fourth) location of the second FIFO buffer. This fifth sample (13) is plotted in FIG. 7 at sample time $t_4$.

Next, at sample time $t_8$, the next sample of $PRE_{Raw}$ is right shifted into the first FIFO buffer, which now has the following contents:

[23 13 14 9 12 9 7]

where the sixth sample (9) of $PRE_{Raw}$ is in the center location of the buffer.

Then, these samples are reordered from lowest to highest and are loaded into the second FIFO buffer as follows:

{7 9 9 12 13 14 23}

Next, the filter 46 generates the sixth sample of $PRE_{Filtered}$ equal to (12), which is the value of the sample in the center (fourth) location of the second FIFO buffer. This sixth sample (12) is plotted in FIG. 7 at sample time $t_5$.

Then, at sample time $t_9$, the next sample of $PRE_{Raw}$ is right shifted into the first FIFO buffer, which now has the following contents:

[13 14 9 12 9 7 8]

where the seventh sample (12) of $PRE_{Raw}$ is in the center location of the buffer.

Next, these samples are reordered from highest to lowest and are loaded into the second FIFO buffer as follows:

{7 8 9 9 12 13 14}

Then, the filter 46 generates the seventh sample of $PRE_{Filtered}$ equal to (9), which is the value of the sample in the center (fourth) location of the second FIFO buffer. This seventh sample (9) is plotted in FIG. 7 at time $t_6$.

Therefore, the first seven samples of $PRE_{Filtered}$ generated by the filter 46 are: 13, 14, 14, 14, 13, 12, and 9.

The filter 46 continues operating in this manner to generate the eighth and higher samples of $PRE_{Filtered}$ until the remaining $PRE_{Raw}$ samples (from the eighth sample onward) are filtered.

Still referring to FIGS. 4 and 7, alternate embodiments of the filter 46 are contemplated. For example, the filter 46 may have a length other than L=7. Generally, the trade off is that smaller values of L introduce less latency, but larger values of L provide a stronger filtering. Furthermore, although shown as being loaded from the right, the $PRE_{Raw}$ samples may be shifted in from the left side of the first FIFO buffer. Moreover, although described as reordering the samples in the first FIFO buffer and loading the reordered samples into the second FIFO buffer, the samples may be reordered after they are loaded into the second FIFO buffer.

Referring to FIGS. 4 and 8, an operation of an embodiment of the curve fitter 48 is described.

The curve fitter 48 receives the $PRE_{Filtered}$ samples 13, 14, 14, 14, 13, 12, 9 . . . from the filter 46 in sequence.

For each of these $PRE_{Filtered}$ samples, the curve fitter 48 fits the current and all prior samples to a fifth-order polynomial that generally represents a decaying exponential. This polynomial may be a finite series expansion of $e^{-R/t}$. For example, this polynomial may include the first six terms of a Taylor or McClauren series expansion. Although the polynomial is always a fifth-order polynomial in this example, the curve fitter 48 can change the curve defined by the polynomial by changing one or more of the coefficients of the polynomial.

Because a single $PRE_{Filtered}$ sample can be fit to any curve, the curve fitter 48 may have a latency of, for example, three or four $PRE_{Filtered}$ samples. Because the curve fitter 48 operates on the $PRE_{Filtered}$ samples from the filter 46, the total latency of the quantity smoother 20 is the sum of the latencies of the filter and the curve fitter. Therefore, one may design the filter 46 and curve fitter 48 such that the latency of the quantity smoother 20 is not greater than a specified latency. As discussed below, the target system 30 makes the latency of the quantity smoother 20 transparent to the pilot by displaying only corresponding samples of $TP_{est}$ and $PPE_{Smooth}$ ($R_{Range\_est}$ and $PRE_{Smooth}$ in the described example).

So, for example purposes, assume that the curve fitter 48 requires at least three $PRE_{Filtered}$ samples to fit to a curve.

Therefore, in response to the third sample (14) of $PRE_{Filtered}$, the curve fitter 48 finds a first fifth-order polynomial that best fits the first three samples (13 14 14) of $PRE_{Filtered}$ using a conventional curve-fitting technique. For example, the curve fitter 48 may find the fifth-order polynomial having the least mean-square difference from the $PRE_{Filtered}$ samples, or may use a Monte Carlo technique to find the best-fit curve. Because these and other techniques for curve fitting are known, a further discussion of how the curve fitter 48 finds the best-fit curve is omitted for brevity.

Next, the curve fitter 48 generates the third sample of $PRE_{Smooth}$ equal to the value of the best-fit curve at $t_2$, which is the sample time corresponding to the third sample of $PRE_{Filtered}$, and the display 40 displays the third sample of $PRE_{Smooth}$ along with the corresponding $t_2$ sample of $R_{Range\_est}$. The curve fitter 48 may also generate the first and second samples of $PRE_{Smooth}$ from this same best-fit curve, although once the third sample of $PRE_{Smooth}$ is generated, it may be unnecessary to display the first and second samples of $PRE_{Smooth}$ to the pilot via the display 40. But for purposes of illustration, these first three samples of $PRE_{Smooth}$ are plotted in FIG. 8 at sample times $t_0$, $t_1$, and $t_2$, respectively (like the plot of FIG. 7, the plot of FIG. 8 has not been time shifted to show the latency introduced by the filter 46 and curve fitter 48).

Then, in response to receiving the fourth sample (14) of $PRE_{Filtered}$, the curve fitter 48 finds a second fifth-order polynomial that best fits the first four samples (13 14 14 14) of $PRE_{Filtered}$. The second polynomial may or may not be the same as the first polynomial previously calculated as the best fit for the first three samples of $PRE_{Filtered}$.

Next, the curve fitter 48 generates the fourth sample of $PRE_{Smooth}$ equal to the value of the second polynomial at $t_3$, which is the sample time corresponding to the fourth sample of $PRE_{Filtered}$, and the display 40 displays the fourth sample of $PRE_{Smooth}$ along with the corresponding $t_3$ sample of $R_{Range\_est}$. The fourth sample of $PRE_{Smooth}$ is plotted in FIG. 8 at time $t_3$.

Because the curve fitter 48 has already generated the first, second, and third samples of $PRE_{Smooth}$ from the first polynomial, and these samples have already been displayed to the pilot on the display 40, there is typically no need to update these first three samples using the second polynomial.

Therefore, FIG. 8 is not necessarily a plot of a single curve calculated by the curve fitter 48, but may instead be a plot of the $PRE_{Smooth}$ samples generated from many curves calculated by the curve fitter 48, up to one curve for each sample.

Then, in response to receiving the fifth sample (13) of $PRE_{Filtered}$, the curve fitter 48 finds a third fifth-order polynomial that best fits the first five samples (13 14 14 14 13) of $PRE_{Filtered}$. The third polynomial may or may not be the same as one of the previously calculated first and second polynomials.

Next, the curve fitter 48 generates the fifth sample of $PRE_{Smooth}$ equal to the value of the third polynomial at $t_4$, which is the sample time corresponding to the fifth sample of $PRE_{Filtered}$, and the display 40 displays the fifth sample of $PRE_{Smooth}$ along with the corresponding $t_4$ sample of $R_{Range\_est}$. The fifth sample of $PRE_{Smooth}$ is plotted in FIG. 8 at time $t_4$.

Then, in response to receiving the sixth sample (12) of $PRE_{Filtered}$, the curve fitter 48 finds a fourth fifth-order polynomial that best fits the first six samples (13 14 14 14 13 12) of $PRE_{Filtered}$. The fourth polynomial may or may not be the same as one of the previously calculated first, second, and third polynomials.

Next, the curve fitter 48 generates the sixth sample of $PRE_{Smooth}$ equal to the value of the fourth polynomial at $t_5$, which is the sample time corresponding to the sixth sample of $PRE_{Filtered}$, and the display 40 displays the sixth sample of $PRE_{Smooth}$ along with the corresponding $t_5$ sample of $R_{Range\_est}$. The sixth sample of $PRE_{Smooth}$ is plotted in FIG. 8 at time $t_5$.

Then, in response to receiving the seventh sample (9) of $PRE_{Filtered}$, the curve fitter 48 finds a fifth fifth-order polynomial that best fits the first seven samples (13 14 14 14 13 12 9) of $PRE_{Filtered}$. The fifth polynomial may or may not be the same as one of the previously calculated first, second, third, and fourth polynomials.

Next, the curve fitter 48 generates the seventh sample of $PRE_{Smooth}$ equal to the value of the fifth polynomial at $t_6$, which is the sample time corresponding to the seventh sample of $PRE_{Filtered}$, and the display 40 displays the seventh sample of $PRE_{Smooth}$ along with the corresponding $t_6$ sample of $R_{Range\_est}$. The seventh sample of $PRE_{Smooth}$ is plotted in FIG. 8 at time $t_6$.

The curve fitter 48 continues operating in this manner to generate the eighth and subsequent samples of $PRE_{Smooth}$ until the remaining $PRE_{Filtered}$ samples (from the eighth sample onward) are fit to a respective curve.

Still referring to FIG. 8, one can see that the samples $PRE_{Smooth}$ oscillate even less than the $PRE_{Filtered}$ samples of FIG. 7, and are significantly smoother than the $PRE_{Filtered}$ samples. Consequently, the $PRE_{Smooth}$ samples may allow the pilot to make a decision regarding the target more quickly and with more confidence than if the pilot were relying on the $PRE_{Raw}$, samples, or even if the pilot were relying on the $PRE_{Filtered}$ samples. For example, even if the pilot waits until the value of the $PRE_{Smooth}$ samples are below 10%, he would have to wait only about seven seconds before he is able to begin making a decision regarding the target.

Referring to FIGS. 4-8, further alternate embodiments of the target system 30 are contemplated. For example, although described as generating samples of $R_{Range\_est}$, $PRE_{Raw}$, $PRE_{Filtered}$, and $PRE_{Smooth}$ every second, the estimator 36, calculator 44, filter 46, and curve fitter 48 may respectively generate samples of these quantities at other intervals. Furthermore, the target system 30 may not display every set of samples on the display 40. For example, the system 30 may generate samples of $R_{Range\_est}$ and $PRE_{Smooth}$ every millisecond, but may display samples of $R_{Range\_est}$ and $PRE_{Smooth}$ on the display 40 only once per second so that the pilot has time to discern and comprehend the samples, and to determine a range window of a target from the samples. Moreover, although described as including two stages, the quantity smoother 20 may include more or fewer than two stages. For example, the smoother 20 may include only the first stage 22 with the filter 46, and provide the samples $PRE_{Filtered}$ directly to the display 40.

FIG. 9 is an overlay of the plots of FIGS. 6-8, and illustrates the successive levels of smoothing of the $PRE_{Raw}$ samples respectively provided by the filter 46 and the curve fitter 48 of FIG. 4.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A quantity smoother, comprising:
a first stage operable to receive a sequence of raw samples of a quantity and to generate from the raw samples intermediate samples of the quantity, the intermediate samples having a reduced level of fluctuation relative to the sequence of raw samples; and
a second stage coupled to the first stage and operable to generate from the intermediate samples resulting samples of the quantity, the resulting samples having a reduced level of fluctuation relative to the sequence of intermediate samples.

2. The apparatus of claim 1 wherein the first stage comprises a filter operable to:
filter the raw samples; and
generate the intermediate samples from the filtered samples.

3. The apparatus of claim 1 wherein the first stage comprises a filter operable to:
median filter the raw samples; and
generate the intermediate samples from the filtered samples.

4. The apparatus of claim 1 wherein the second stage comprises a curve fitter operable:
to fit at least two of the intermediate samples to a polynomial; and
to generate the resulting samples from the values of the polynomial at the sample times of the intermediate samples.

5. The apparatus of claim 1 wherein the second stage comprises a curve fitter operable:
to fit at least two of the intermediate samples to a fifth-order polynomial; and
to generate the resulting samples from the values of the polynomial at the sample times of the intermediate samples.

6. An apparatus, comprising:
a parameter estimator operable to estimate a parameter from data related to the parameter;
an error determiner operable to determine a raw error in the estimated parameter from information related to a level of accuracy of the data; and
an error smoother operable to generate a smoothened error from the raw error.

7. The apparatus of claim 6 wherein:
the parameter comprises a range from a ranging object to a ranged object; and the data comprises at least one spatial coordinate of the ranged object.

8. The apparatus of claim 6 wherein the parameter estimator is operable to estimate the parameter according to a Kalman algorithm.

9. The apparatus of claim 6 wherein the error determiner is operable to determine the raw error in the estimated parameter in response to an accuracy value related to the accuracy of the estimated parameter.

10. The apparatus of claim 9, further comprising an accuracy determiner operable to determine the accuracy value from the accuracy of the data.

11. The apparatus of claim 9 wherein the accuracy value comprises a standard deviation associated with the estimated parameter.

12. The apparatus of claim 6 wherein the error smoother comprises:
a filter operable to filter the raw error; and
a curve fitter operable to fit the filtered error to a curve and to generate from the curve the smoothened error in the estimated parameter.

13. The apparatus of claim 12 wherein the filter comprises a median filter.

14. The apparatus of claim 12 wherein the curve fitter is operable to fit the filtered error to a curve that is defined by a fifth-order polynomial.

15. The apparatus of claim 6, further comprising:
an antenna operable to receive a signal from an object; and
a processor operable to derive from the signal at least one spatial coordinate of the object and to provide the spatial coordinate to the parameter estimator as the data.

16. The apparatus of claim 6, further comprising a display operable:
to display a first value corresponding to the estimated parameter; and
to display a second value corresponding to the smoothened error.

17. The apparatus of claim 6 wherein the parameter estimator is operable to estimate the parameter recursively from past values of the parameter.

18. A system, comprising:
a vehicle; and
an apparatus, comprising:
a estimator operable to estimate a parameter related to a location of the vehicle from data related to the parameter;
an error determiner operable to determine a raw error in the estimated parameter from information related to an error in the data; and
an error smoother operable to generate a smoothened error from the raw error.

19. The system of claim 18 wherein the vehicle comprises an aircraft.

20. The system of claim 18 wherein:
the parameter comprises a range from the vehicle to an object spaced from the vehicle; and
the data comprises at least one spatial coordinate of the object.

21. The system of claim 18 wherein the apparatus is located on the vehicle.

22. The system of claim 18, further comprising:
an antenna disposed on the vehicle and operable to receive a signal from an object that is spaced from the vehicle; and
a processor operable to derive from the signal at least one spatial coordinate of the object and to provide the spatial coordinate to the parameter estimator as the data.

23. The system of claim 18, further comprising an operator display disposed on the vehicle and operable:
to display a first value corresponding to the estimated parameter; and
to display a second value corresponding to the smoothened error.

24. A method, comprising:
receiving a sequence of raw samples of a quantity;
generating from the raw samples intermediate samples of the quantity, the intermediate samples having a reduced level of fluctuation relative to the sequence of raw samples; and
generating from the intermediate samples resulting samples of the quantity, the resulting samples having a reduced level of fluctuation relative to the sequence of intermediate samples.

25. A method, comprising:
receiving a sequence of raw samples of an error in a parameter;
generating from the raw samples intermediate samples of the error, the intermediate samples having a reduced level of fluctuation relative to the sequence of raw samples; and
generating from the intermediate samples resulting samples of the error, the resulting samples having a reduced level of fluctuation relative to the sequence of intermediate samples.

26. A method, comprising:
estimating a parameter from data related to the parameter;
generating a raw error in the estimated parameter from information related to an accuracy of the estimated parameter; and
smoothing the raw error.

27. The method of claim 26 wherein:
generating a raw error comprises generating a raw maximum error; and
smoothing the error comprises smoothing the raw maximum error.

28. The method of claim 26 wherein the information comprises a standard deviation associated with the estimated parameter.

29. The method of claim 26, further comprising:
generating from the information a standard deviation associated with the estimated parameter; and
wherein generating the raw error comprises generating the raw error in response to the standard deviation.

30. The method of claim 26 wherein smoothing the raw error comprises:
median filtering the raw error;
fitting the filtered error to a curve; and
generating from the curve a smoothened error in the estimated parameter.

31. The method of claim 26, further comprising:
wherein the parameter comprises a range between first and second objects;
receiving a signal from the second object at the first object; and
deriving from the signal at least one spatial coordinate of the second object, the at least one spatial coordinate composing at least a portion of the data.

32. The method of claim 26, further comprising displaying to a pilot a first value corresponding to the estimated parameter and a second value corresponding to the smoothened error.

33. The method of claim 26 wherein estimating the parameter comprises recursively estimating the parameter from previous values of the parameter.

34. A non-transitory computer-readable medium storing instructions that, when executed by a computing machine, cause the computing machine:

to estimate a parameter from data related to the parameter;

to generate a raw error in the estimated parameter from information related to an accuracy of the estimated parameter; and to smoothen the raw error.

35. A non-transitory computer-readable medium storing instructions that, when executed by a computing machine, cause the computing machine:

to generate from a received sequence of raw samples of a quantity intermediate samples of the quantity, the intermediate samples having a reduced level of fluctuation relative to the sequence of raw samples; and to generate from the intermediate samples resulting samples of the quantity, the resulting samples having a reduced level of fluctuation relative to the sequence of intermediate samples.

36. A non-transitory computer-readable medium storing instructions that, when executed by a computing machine, cause the computing machine:

to generate from a received sequence of raw samples of an error in a quantity intermediate samples of the error, the intermediate samples having a reduced level of fluctuation relative to the sequence of raw samples; and to generate from the intermediate samples resulting samples of the error, the resulting samples having a reduced level of fluctuation relative to the sequence of intermediate samples.

* * * * *